(12) United States Patent
Ogren et al.

(10) Patent No.: US 6,422,902 B1
(45) Date of Patent: Jul. 23, 2002

(54) LOW PROFILE TELECOMMUNICATIONS JACK WITH LAMP SWITCH

(75) Inventors: Bruce C. Ogren, Edina; Daniel Skovran, Minnetonka, both of MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/710,007

(22) Filed: Nov. 10, 2000

(51) Int. Cl.[7] .................................................. H01R 24/04
(52) U.S. Cl. ........................ 439/668; 439/490; 439/108; 439/669
(58) Field of Search .......................... 439/668, 669, 439/188, 488, 489, 490, 714, 49

(56) References Cited

U.S. PATENT DOCUMENTS

| | | |
|---|---|---|
| 3,852,703 A | 12/1974 | Carney et al. |
| 4,753,609 A | 6/1988 | Pfeffer et al. |
| 4,770,639 A | 9/1988 | Lau |
| 4,840,568 A | 6/1989 | Burroughs et al. |
| 4,870,753 A | 10/1989 | Pfeffer et al. |
| 4,975,087 A | 12/1990 | Williams et al. |
| 5,145,416 A | 9/1992 | Cruise et al. |
| 5,170,327 A | 12/1992 | Burroughs |
| 5,199,878 A | 4/1993 | Dewey et al. |
| 5,348,491 A | 9/1994 | Louwagie et al. |
| 5,393,249 A | 2/1995 | Morgenstern et al. |
| 5,413,494 A | 5/1995 | Dewey et sl. |
| 5,439,395 A * | 8/1995 | Laukzemis .................. 439/668 |
| 5,467,062 A | 11/1995 | Burroughs |
| 5,634,822 A * | 6/1997 | Gunell ........................ 439/668 |
| 5,685,741 A | 11/1997 | Dewey et al. |
| 5,879,197 A | 3/1999 | Dewey |
| 5,938,478 A * | 8/1999 | Werner ....................... 439/668 |
| 6,116,961 A | 9/2000 | Henneberger et al. |

* cited by examiner

*Primary Examiner*—Tho D. Ta
(74) *Attorney, Agent, or Firm*—Merchant & Gould P.C.

(57) ABSTRACT

A telecommunications apparatus for use with a signal lamp. The apparatus includes a jack having a jack body defining an IN port, an OUT port and a MONITOR port. The ports are aligned along a vertical line with the OUT port positioned above the IN port and the MONITOR port positioned above the OUT port. A first set of spring contacts is provided for contacting a plug inserted in the IN port, a second set of spring contacts is provided for contacting a plug inserted in the OUT port, and a third set of spring contacts is provided for contacting a plug inserted in the MONITOR port. The telecommunications apparatus further includes a lamp switch for activating the signal lamp when a plug is inserted in the MONITOR port. The lamp switch is positioned below the third set of spring contacts and above the second set of spring contacts.

23 Claims, 20 Drawing Sheets

US 6,422,902 B1

LOW PROFILE TELECOMMUNICATIONS JACK WITH LAMP SWITCH

FIELD OF THE INVENTION

The present invention relates generally to cross-connect assemblies and, in particular, to jack assemblies for digital cross-connect systems.

BACKGROUND OF THE INVENTION

A digital cross-connect system (DSX) provides a location for interconnecting two digital transmission paths. The apparatus for a DSX is located in one or more frames, or bays, usually in a telephone central office. The DSX apparatus also provides jack access to the transmission path.

DSX jacks are well known in the art (e.g., see U.S. Pat. Nos. 6,116,961; 5,393,249; 5,145,416; and 4,840,568 that are assigned to ADC Telecommunications, Inc.). A typical jack includes a plurality of bores (i.e., ports) sized for receiving tip-and-ring plugs. Spring contacts are provided adjacent to the bores for contacting the tip-and-ring plugs. In use, DSX jacks are typically electrically connected to digital transmission lines, and are also electrically connected to a plurality of wire termination members used to cross-connect the jacks. By inserting plugs within the bores of the jacks, signals transmitted through the jacks can be interrupted or monitored.

SUMMARY OF THE INVENTION

One aspect of the present invention relates to a telecommunications jack including a jack body defining first, second and third ports. The ports are relatively arranged such that the second port is generally between the first and third ports. The jack also includes a first set of spring contacts positioned adjacent the first port, a second set of spring contacts positioned adjacent the second port, and a third set of spring contacts positioned adjacent the third port. A lamp switch for activating and de-activating a signal lamp is positioned between the second and third sets of spring contacts.

Another aspect of the present invention relates to a telecommunications apparatus for use with a signal lamp. The apparatus includes ajack having ajack body defining an IN port, an OUT port and a MONITOR port. The ports are aligned along a vertical line with the OUT port positioned above the IN port and the MONITOR port positioned above the OUT port. A first set of spring contacts is provided for contacting a plug inserted in the IN port, a second set of spring contacts is provided for contacting a plug inserted in the OUT port, and a third set of spring contacts is provided for contacting a plug inserted in the MONITOR port. The telecommunications apparatus further includes a lamp switch for activating the signal lamp when a plug is inserted in the MONITOR port. The lamp switch is positioned below the third set of spring contacts and above the second set of spring contacts.

A further aspect of the present invention relates to a telecommunications apparatus including a chassis having oppositely positioned first and second sides. A plurality of light emitting diodes are positioned at the first side of the chassis. An IN/OUT panel including an array of IN and OUT connection locations is positioned at the second side of the chassis. A cross-connect panel including an array of cross-connect connections locations is also positioned at the second side of the chassis. A plurality of jacks is mounted in the chassis. Each of the jacks includes: (1) a jack body defining a first port, a second port and a third port; (2) a first set of spring contacts positioned adjacent the first port; (3) a second set of spring contacts positioned adjacent the second port; (4) a third set of spring contacts positioned adjacent the third port; and (5) a lamp switch positioned between the second and third sets of spring contacts. The first and second sets of spring contacts are electrically connected to the cross-connect panel and the IN/OUT panel. The third sets of spring contacts are electrically connected to corresponding ones of the second sets of spring contacts such that signals transmitted through the second sets of spring contacts can be monitored by inserting plugs in the third ports. The lamp switches are electrically connected to the light emitting diodes such that when each lamp switch is closed, a corresponding one of the light emitting diodes is activated. Preferably, each lamp switch is configured to close when a plug is inserted within a corresponding one of the third ports.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows.

DETAILED DESCRIPTION

Figure 1:
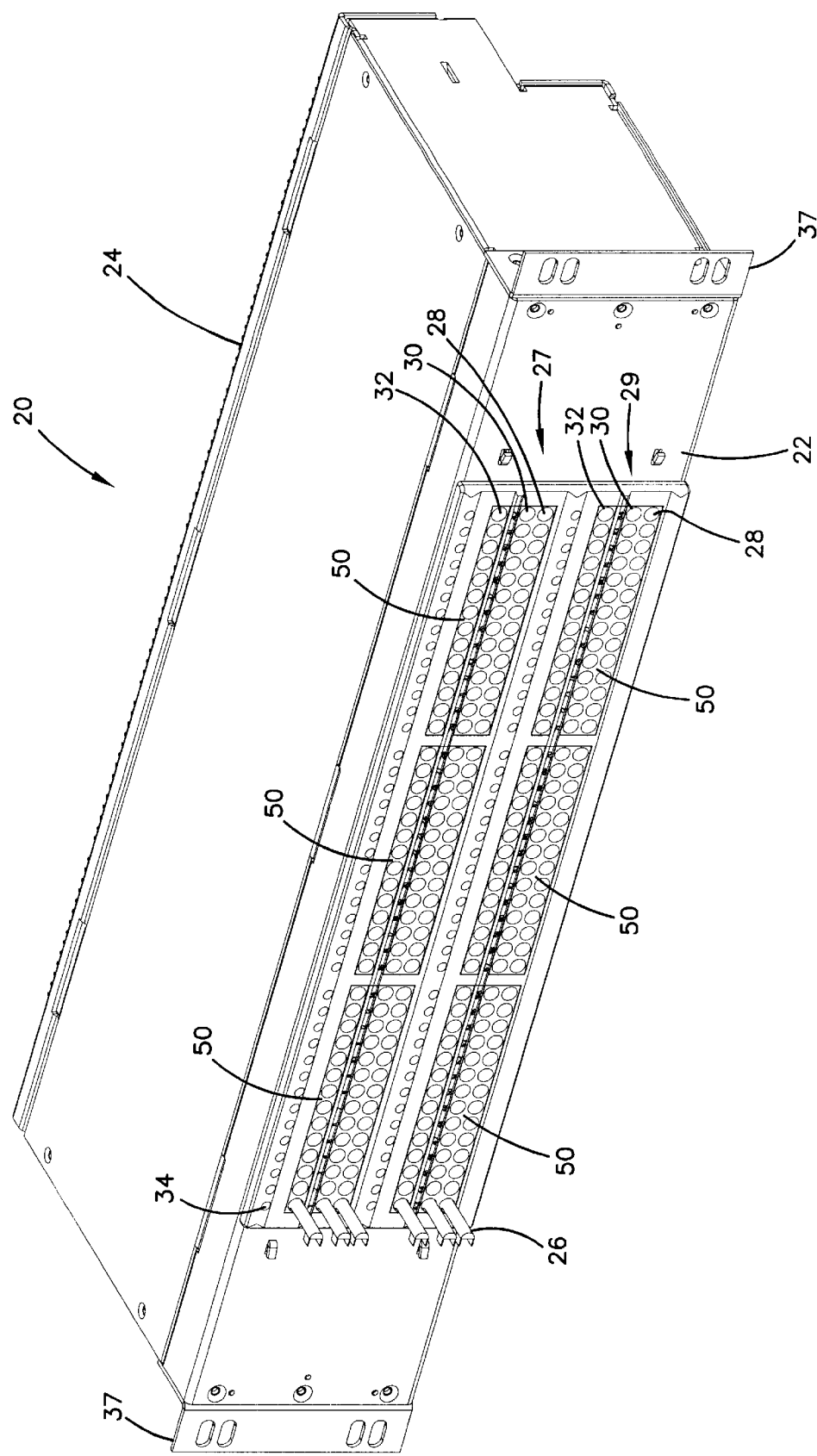
FIG. 1 is a front, perspective view of a loaded DSX chassis constructed in accordance with the principles of the present invention.

Reference will now be made in detail to exemplary aspects of the present invention which are illustrated in the accompanying drawings. Wherever possible, the same reference numbers will be used throughout the drawings to refer to the same or like parts.

I. DSX CHASSIS

FIGS. 1–5 illustrate a DSX chassis 20 (i.e., a box, module or housing) constructed in accordance with the principles of the present invention. The chassis 20 includes a front side 22 (shown in FIG. 1) positioned opposite from a rear side 24 (shown in FIG. 2). Ports for receiving tip-and-ring plugs 26 are provided at the front side 22 of the chassis. The ports are arranged in upper and lower arrays 27 and 29. Each of the arrays 27 and 29 includes a horizontal row of IN ports 28, a horizontal row of OUT ports 30 and a horizontal row of MONITOR ports 32. Additionally, a horizontal row of LED ports 34 is provided above each of the upper and lower arrays 27 and 29. The LED ports 34 are configured for receiving light sources/lamps such as light emitting diodes 36(shown in FIG. 6). The chassis 20 also includes front flanges 37 for mounting the chassis in a bay of a telecommunications rack or frame.

Figure 2:
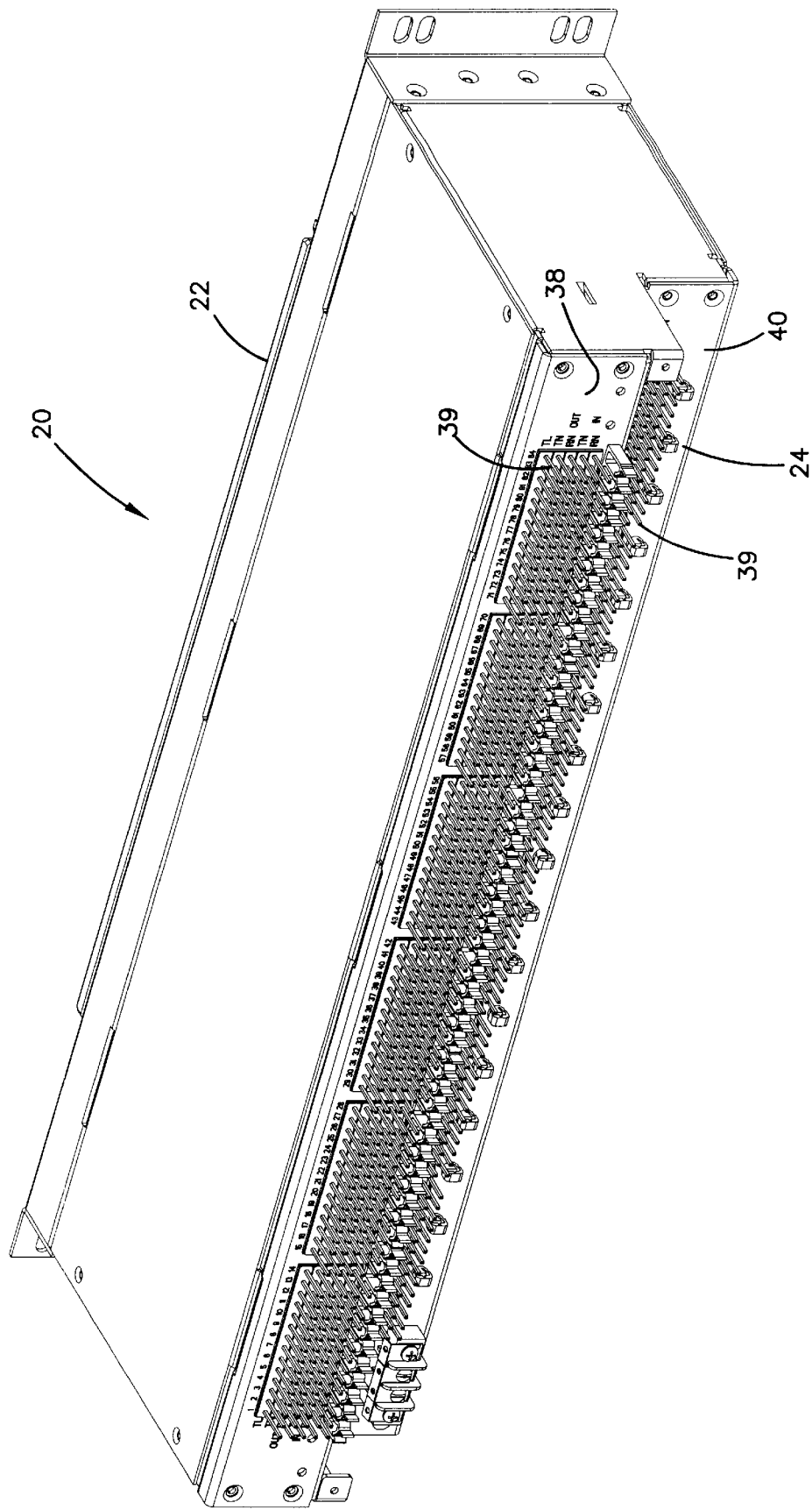
FIG. 2 is a rear, perspective view of the chassis of FIG. 1.

As shown in FIG. 2, the chassis 20 further includes a X-CONN panel 38 (i.e., a cross-connect panel) and an IN/OUT panel 40. The X-CONN panel 38 and the IN/OUT panel 40 are located at the rear side 24 of the chassis 20 and are staggered or offset relative to one another. The X-CONN panel 38 includes multiple arrays of cross-connect locations. By way of non-limiting example, the cross-connect locations are provided by wire termination members (i.e., wire wrap pins 39) that project outwardly from the rear side 24 of the chassis 20. However, it will be appreciated that other types of contacts or connectors can also provide the connection locations.

Figure 3:
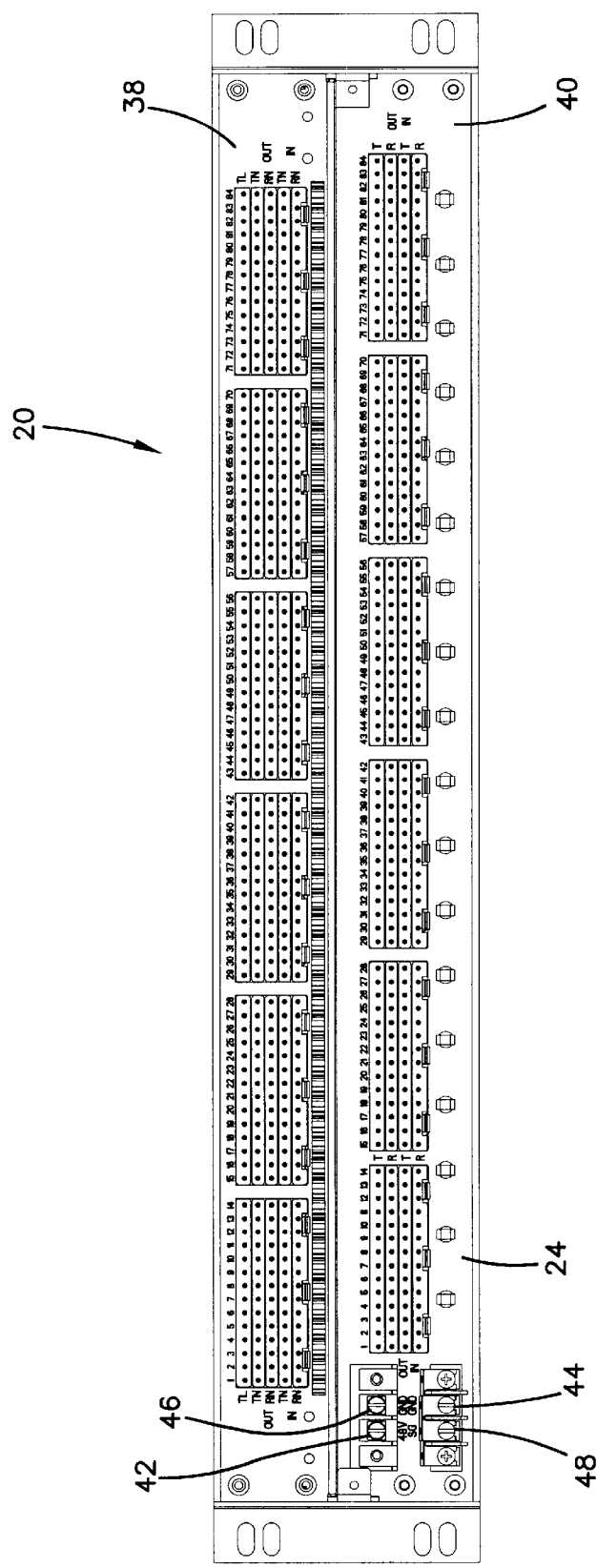
FIG. 3 is a rear, elevational view of the chassis of FIG. 1.
Figure 4:
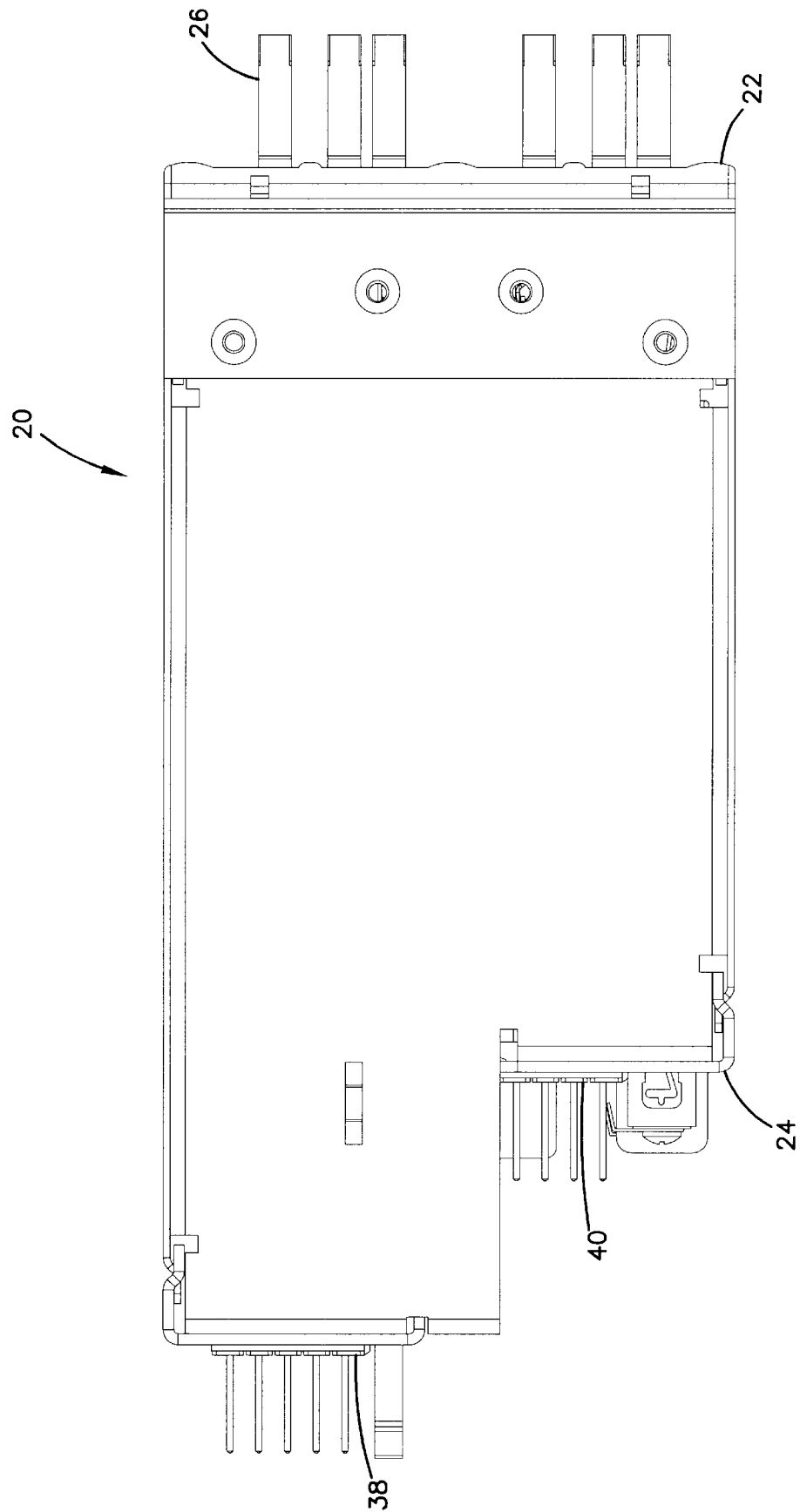
FIG. 4 is a side, elevational view of the chassis of FIG. 1.
Figure 5:
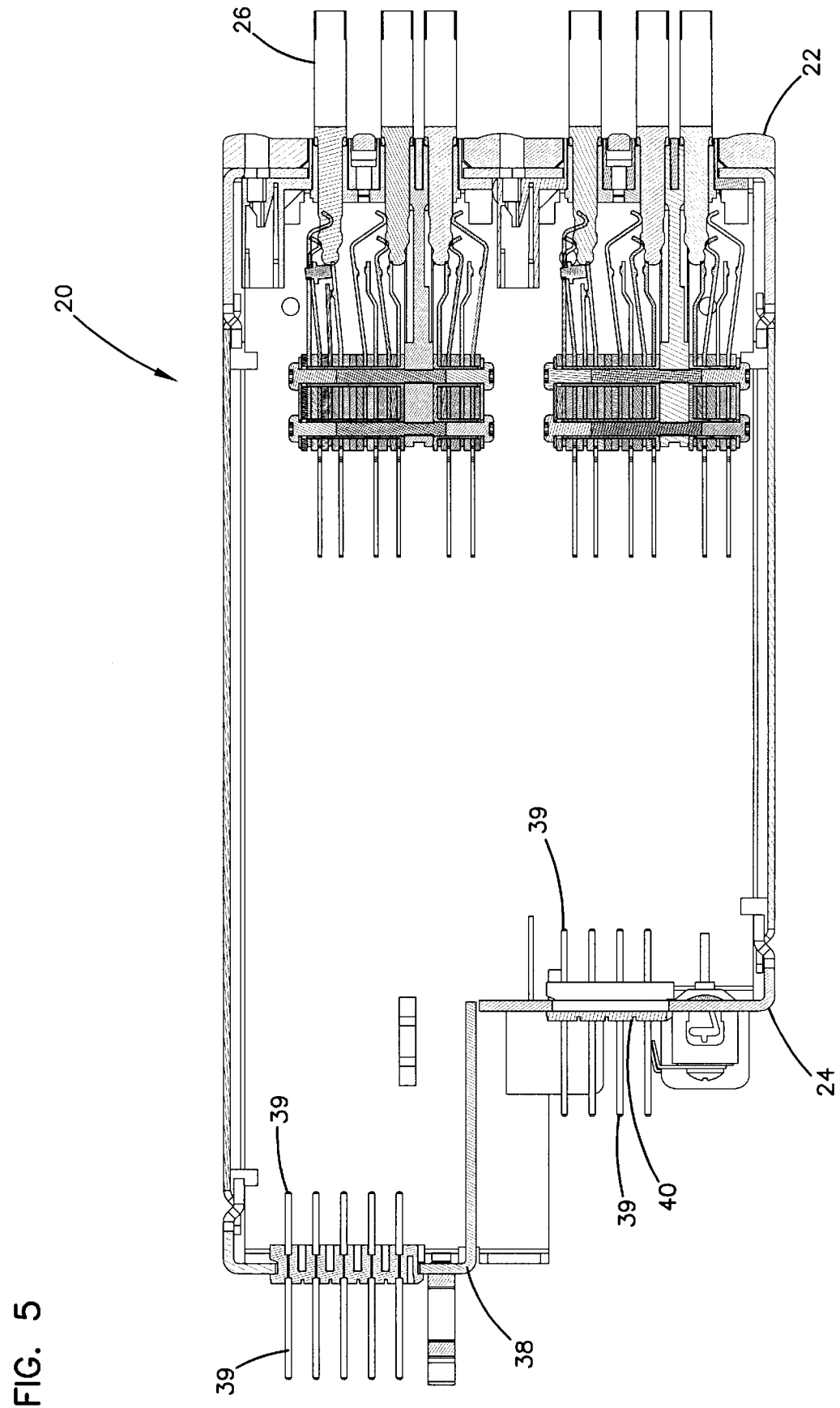
FIG. 5 is a cross-sectional view of the chassis of FIG. 1 taken along a vertical cross-sectional cutting plane.

As best shown in FIG. 3, the connection locations provided at the X-CONN panel 38 include tracer lamp (TL) connection locations, tip normal-out (TN-OUT) connection locations, ring normal-out (RN-OUT) connection locations, tip normal-in (TN-IN) connection locations and ring normal-in (RN-IN) connection locations. As used herein, the term "panel" will be understood to mean any type of structure at which connection locations can be provided.

Still referring to FIG. 3, the IN/OUT panel 40 includes a plurality of arrays of IN/OUT connection locations. While any type of known electrical connector can provide the connection locations, the connection locations are shown as being provided by wire termination members in the form of wire wrap pins 39. The arrays of IN/OUT connection locations provided at the IN/OUT panel 40 include tip-out (T-OUT) connection locations, ring-out (R-OUT) connection locations, tip-in (T-IN) connection locations and ring-in (R-IN) connections locations. Also provided at the rear side 24 of the chassis 20 is a power/voltage connection location 42, chassis ground connection location 44, battery ground connection location 46 and a shield ground connection location 48.

II. JACK INSERT SUBASSEMBLY

Referring back to FIG. 1, each of the upper and lower arrays 27 and 29 of ports is formed by three separate jack insert subassemblies 50 that are mounted in the chassis 20. Preferably, the jack insert subassemblies 50 are connected to the chassis 20 by conventional techniques such as fasteners. In FIG. 1 the fasteners are covered by a rectangular fascia. FIGS. 6–10 show one of the jack insert subassemblies 50 in isolation from the chassis. The depicted jack insert subassembly 50 includes fourteen separate DSX jacks 52 secured to a common jack insert body 54. Preferably, the jack insert body 54 is made of a dielectric material such as plastic.

i. Representative Jack Configuration

Figure 10:
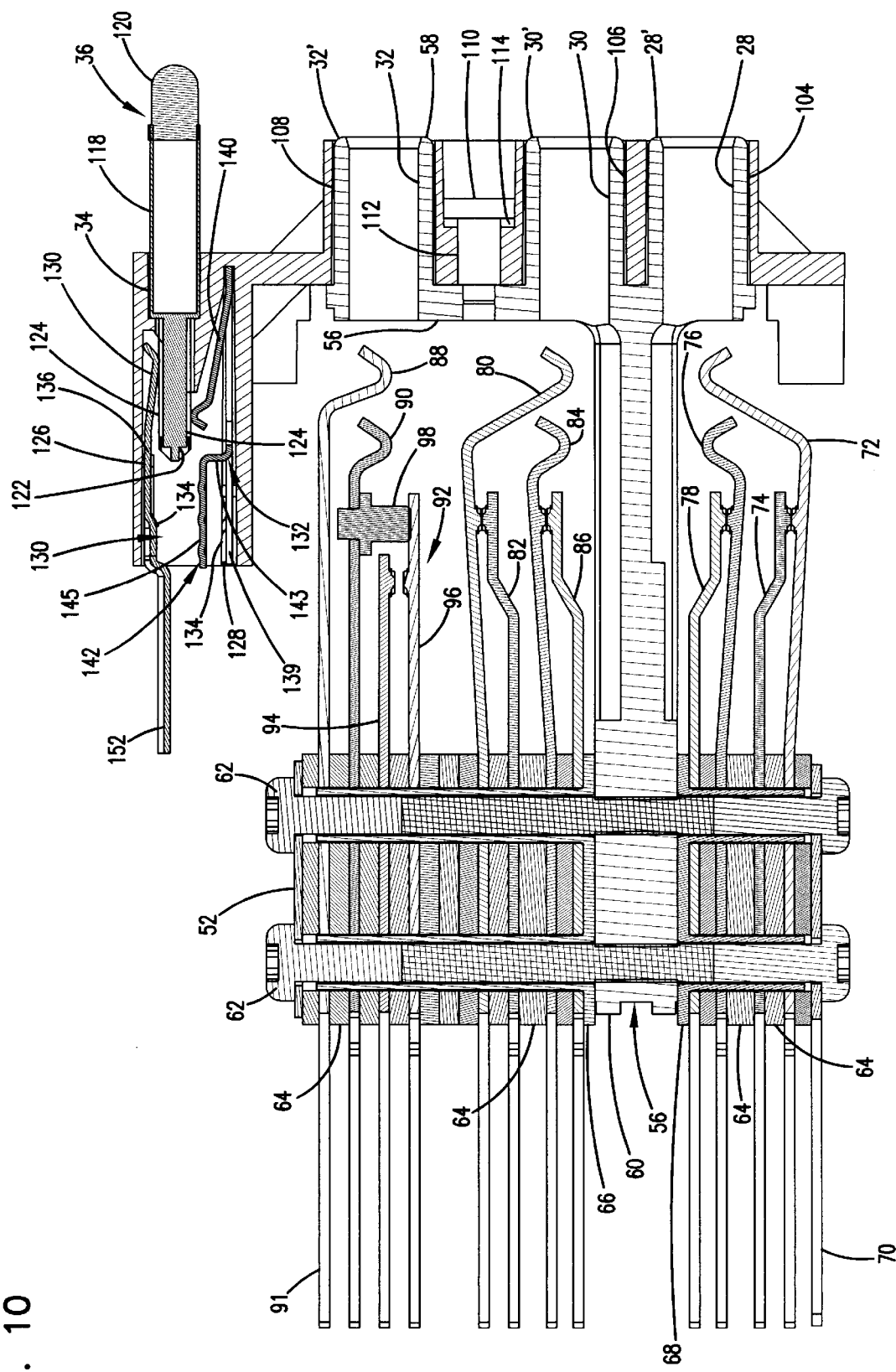
FIG. 10 is a cross-sectional view taken along section line 10—10 of FIG. 9.

FIG. 10 is a cross-sectional view through one of the jacks 52 of the jack insert subassembly 50 depicted in FIGS. 6–9. Jack 52 includes a frame 56 preferably made of a conductive material (e.g., a metal such as die cast zinc). The frame 56 includes a forward face 58 and a rearwardly extending spring mount 60. The forward face 58 includes a monitor sleeve 32' defining MONITOR port 32, an out sleeve 30' defining OUT port 30 and an in sleeve 28' defining IN port 28. A stack of contact springs is secured to the spring mount 60 of the frame 56 by two fasteners 62 (e.g., bolts, pins or screws). As is conventionally known in the art, the stacked springs are preferably separated by dielectric spacers 64. Dielectric spacers 66 and 68 are also provided for isolating the fasteners 62 from the springs. The fasteners 62 are preferably in electrical contact with the frame 56 (e.g., at the region the fasteners 62 pass through the spring mount 60). A grounding spring 70 is electrically connected to the fasteners 62 to provide a connection location for grounding the frame 56 to the shield ground 48 of the chassis 20.

The stack of contact springs includes a first set of springs positioned adjacent the IN port 28, a second set of springs positioned adjacent the OUT port 30, and a third set of springs positioned adjacent the MONITOR port 32. The first set of springs includes an in ring spring 72, a corresponding in ring normal spring 74, an in tip spring 76 and a corresponding in tip normal spring 78. The second set of spring contacts include an out ring spring 80, a corresponding out ring normal spring 82, an out tip spring 84 and a corresponding out tip normal spring 86. The third set of spring contacts includes a monitor ring spring 88 and a monitor tip spring 90. Each of the springs has rear wire wrap portions 91 for allowing the springs to be connected to corresponding connection locations at the cross-connect panel 38 or the IN/OUT panel 40 of the chassis 20.

A lamp switch 92 is positioned between the second and third sets of spring contacts (i.e., the lamp switch 92 is positioned between spring contacts 80–84 corresponding to the OUT port 30 and spring contacts 88, 90 corresponding to the MONITOR port 32). When the chassis 20 is wired, the lamp switch 92 is preferably electrically connected to LED 36 such that when the lamp switch 92 is closed, LED 36 is activated (i.e., illuminated or caused to flash).

Figure 13:
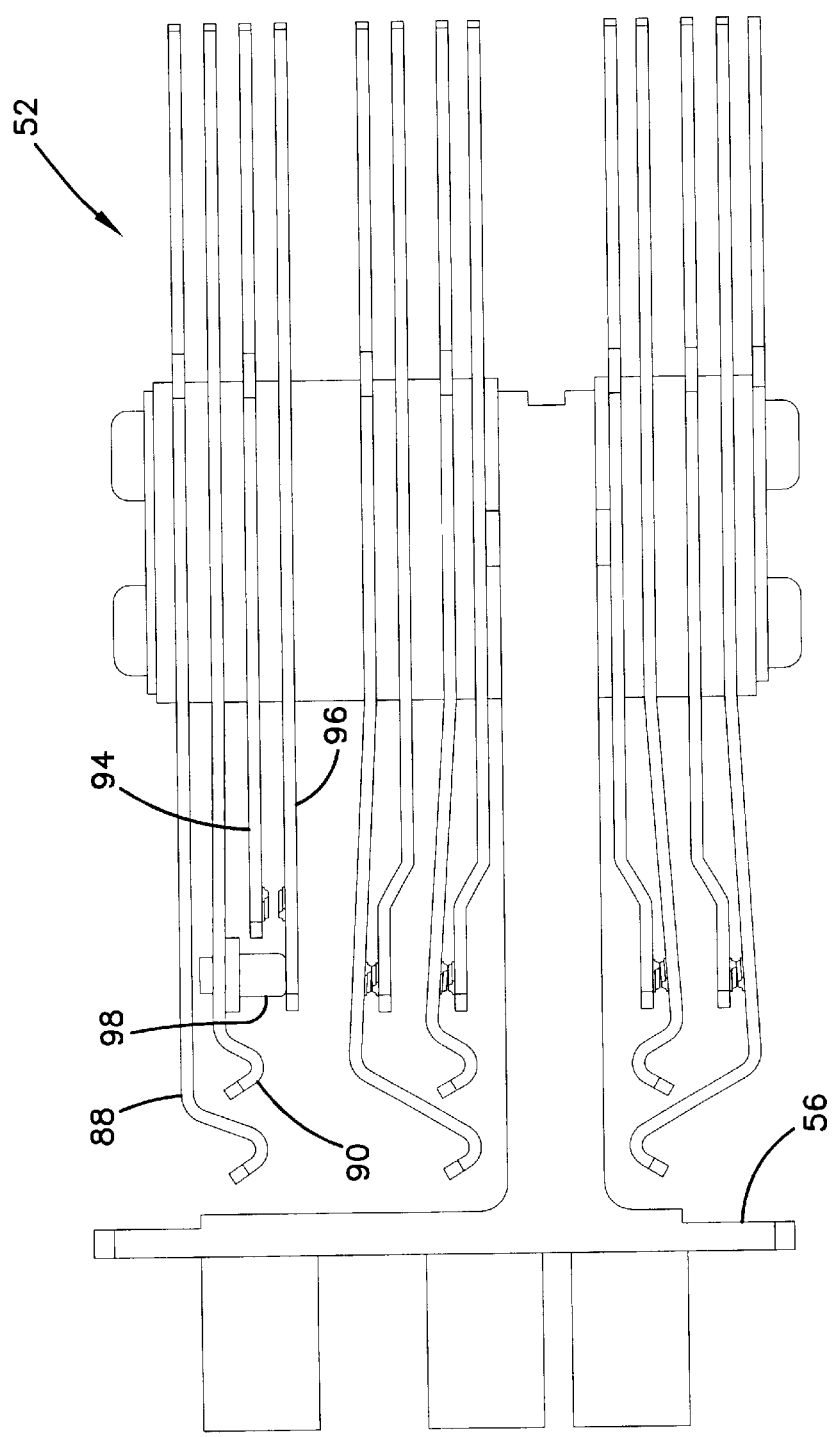
FIG. 13 illustrates a jack constructed in accordance with the principles of the present invention.
Figure 14:
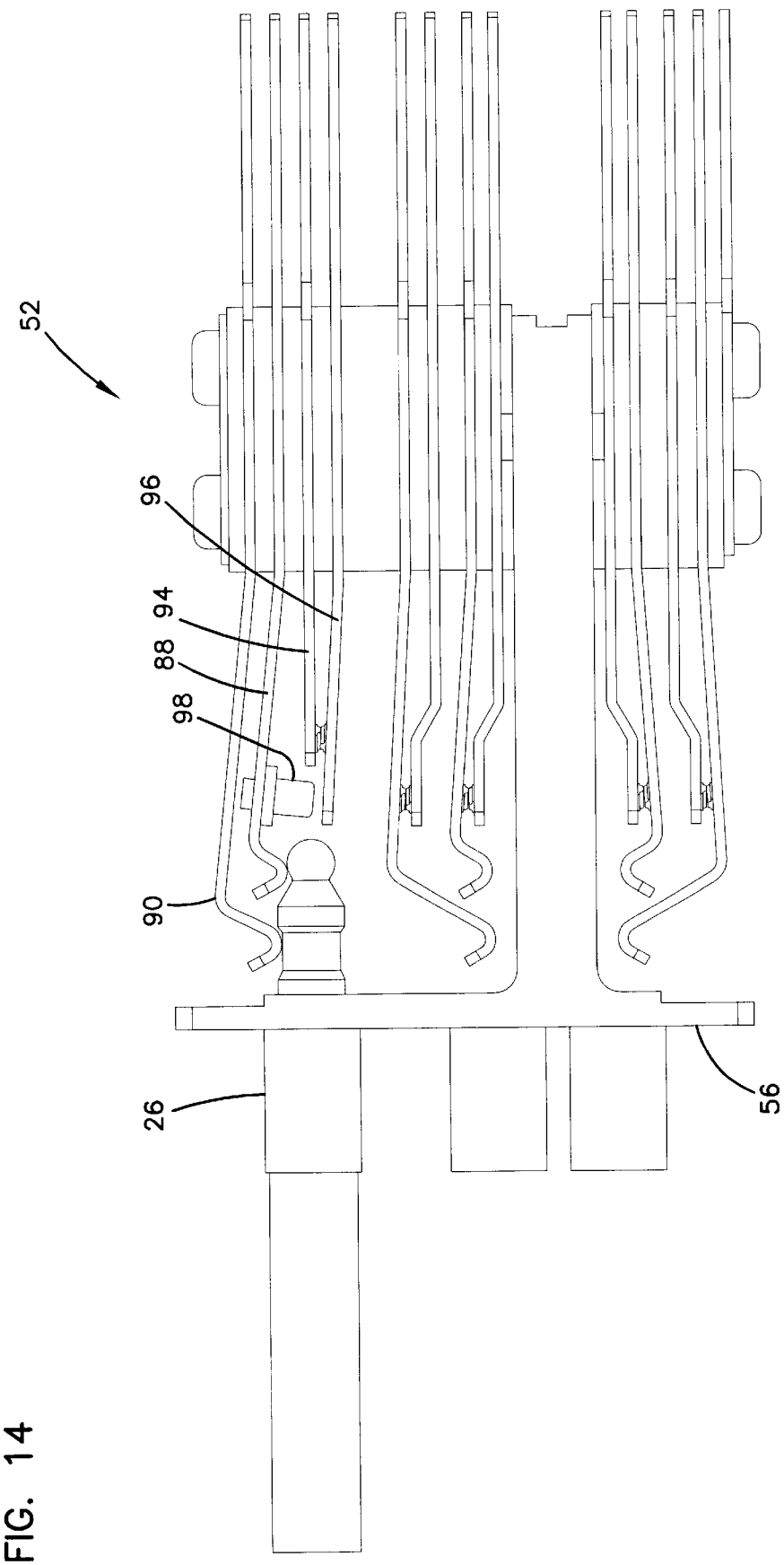
FIG. 14 shows the jack of FIG. 13 with a plug inserted in the monitor port and a lamp switch of the jack oriented in a closed position.

The lamp switch 92 is preferably caused to close when a plug is inserted within the MONITOR port 32. In the embodiment of FIG. 10, the lamp switch 92 includes first and second contact springs 94 and 96. The second contact spring 96 is preferably bent or otherwise provided with a bias (See FIG. 14 where the bend of the spring 96 is visible) that inherently urges the second contact spring 96 toward the closed position. As shown in FIGS. 10 and 13, the second contact spring 96 is held in an open position by a dielectric spacer 98 mounted on the monitor tip spring 90. Preferably, the monitor tip spring 90 balances/counteracts the bias of the second contact spring 96 and prevents the second contact spring 96 from contacting the first contact spring 94. However, when a plug is inserted in the monitor port 32 as shown in FIG. 14, the monitor tip spring 90 is forced upwardly by the plug thereby displacing the dielectric spacer 98 from the second contact spring 96. With the dielectric spacer 98 displaced, the natural bias of the second contact spring 96 causes the second contact spring 96 to move into contact with the first contact spring 94 thereby closing the lamp switch 92 and illuminating the LED 36.

It is noted that in a typical prior art jack such as the one disclosed in U.S. Pat. No. 5,145,416, the lamp switch is provided above the monitor tip and ring springs. In contrast, the lamp switch 92 of the present invention is positioned below the monitor springs 88 and 90 at a location between the monitor springs 88 and 90 and the springs 80–86 corresponding to the OUT port 30. By placing the lamp switch 92 at such a position, it is possible to reduce the height or profile of the jack 52 as compared to the prior art. This reduction in height assists in increasing the circuit density of the chassis 20.

ii. Jack Insert Body Configuration

Referring back to FIG. 6, the jack insert body 54 of the jack insert subassembly 50 includes a jack mount portion 100 and an LED mount portion 102. The jack mount portion 100 and the LED mount portion 102 are preferably formed as a single, unitary piece. For example, the portions 100 and 102 can be molded as a one-piece plastic part. In the preferred embodiment, no fasteners for connecting the insert body 54 to the chassis are provided in the region between the two portions 100 and 102. Further, in the preferred embodiment, no gap or spacing is provided between the two portions 100 and 102.

The jack mount portion 100 includes an array of openings for receiving the monitor sleeves 32', the out sleeves 30' and the in sleeves 28' of the jacks 52. For example, the jack mount portion 100 includes a first horizontal row of openings 104 for receiving the in sleeves 28', a second horizontal row of openings 106 for receiving the out sleeve 30', and a third horizontal row of openings 108 for receiving the monitor sleeves 32'. The LED mount portion 102 defines a horizontal row of the LED ports 34 that are sized for receiving the light emitting diodes 36. By making the jack mount portion 100 and the LED mount portion 102 a single unitary piece, it has been determined that the overall height of the structure can be reduced thereby helping to maximize the circuit density of the chassis 20.

Figure 6:
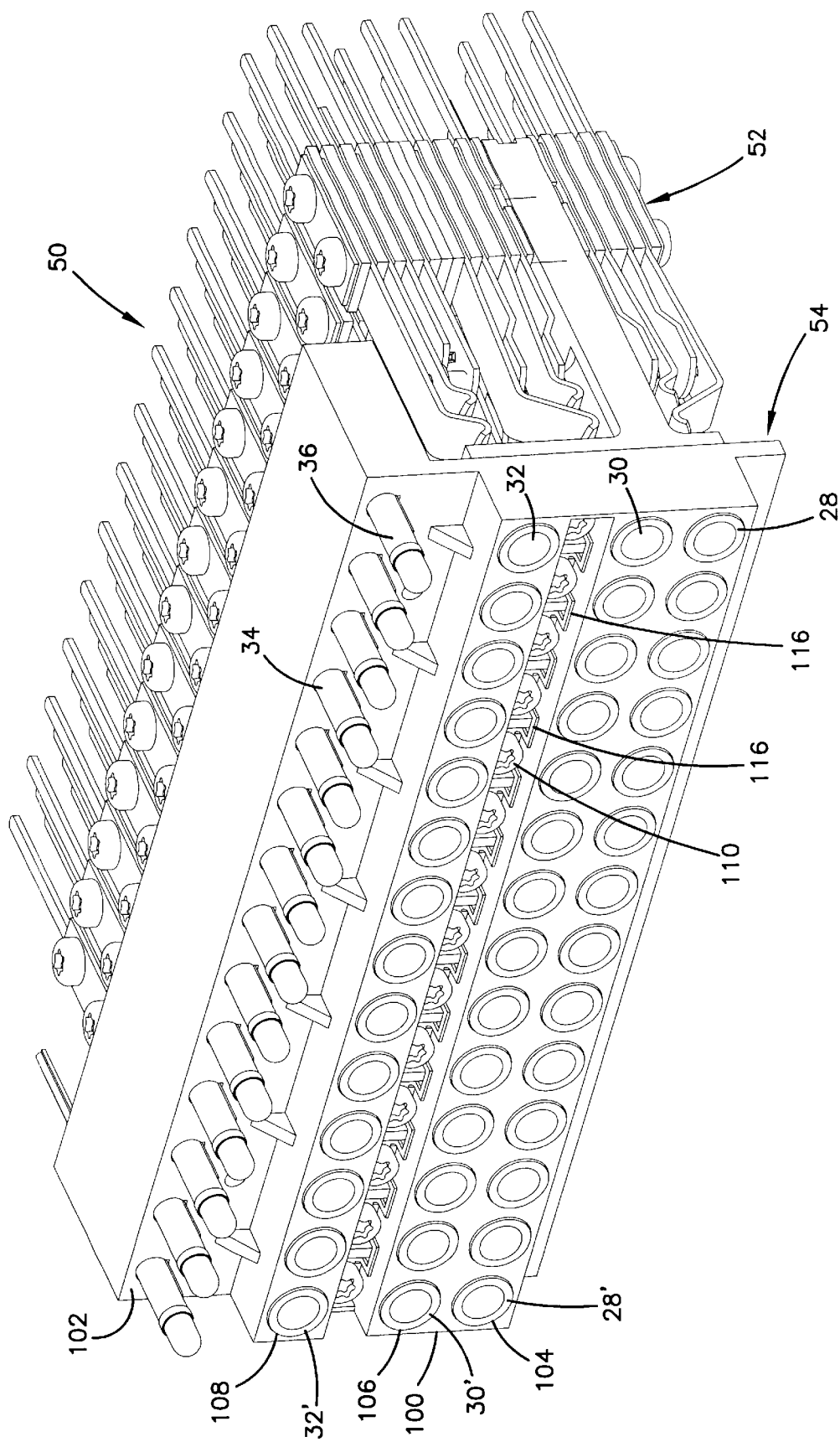
FIG. 6 is a front, perspective view of ajack insert subassembly constructed in accordance with the principles of the present invention.
Figure 8:
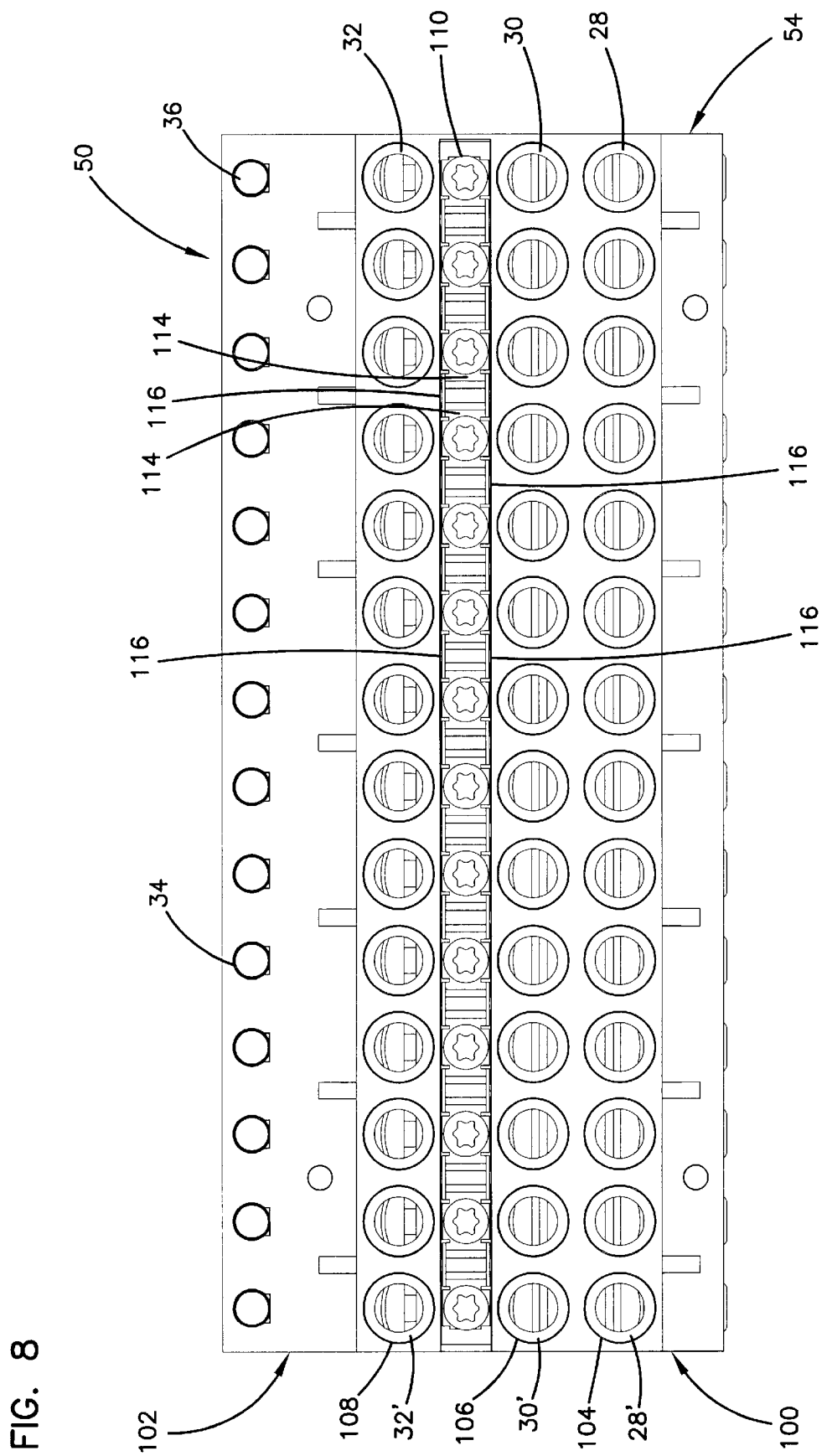
FIG. 8 is a front, elevational view of the jack insert subassembly of FIG. 6.
Figure 9:
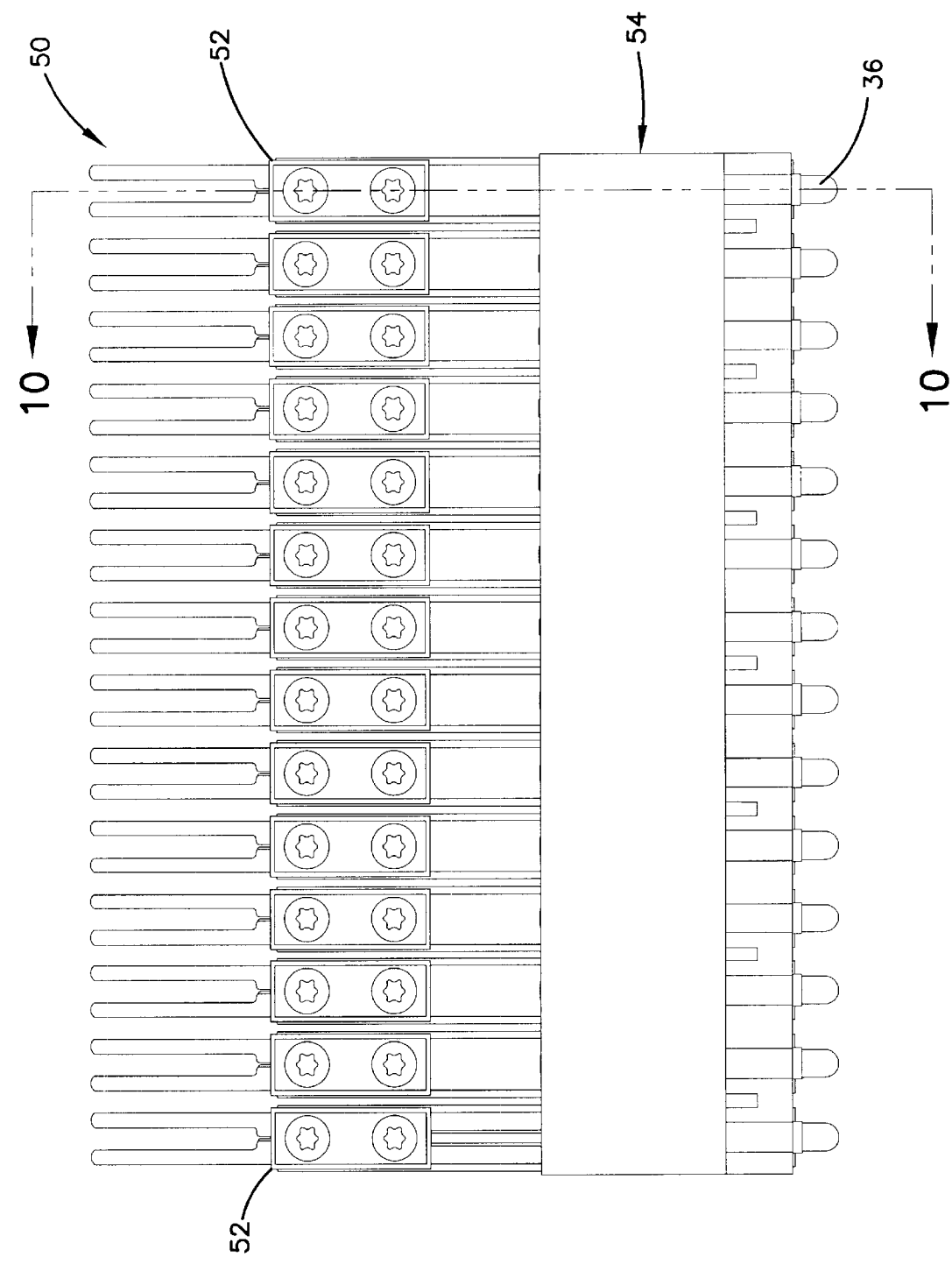
FIG. 9 is a top, plan view of the jack insert subassembly of FIG. 6.

Referring to FIGS. 6, 8 and 10, each of the jacks 52 is secured to the jack insert body 54 by a single fastener 110 (e.g., a screw or bolt). Preferably, the fastener 110 is made of an electrically conductive material (e.g., a metal such as zinc-plated steel). As shown in FIG. 10, the fastener 110 extends through an opening 112 defined by the jack insert 54 and connects with the frame 56 of the jack 52 (e.g., the fastener is shown threaded into the frame 56). It is preferred for the fastener 110 to be located between the MONITOR port 32 and the OUT port 30. By using a single fastener positioned at a central location of the jack 52, it is possible to reduce the overall height of the jack insert subassembly 50 as compared to prior art subassemblies that have fasteners adjacent the top and bottom of the jack.

Referring to FIG. 10, a reinforcing member 114 is preferably positioned between the head of the fastener 110 and the jack insert 54. The reinforcing member 114 essentially functions as a washer-type structure. If the reinforcing member 114 is made of an electrically conductive material, conductive linking members 116 (best shown in FIGS. 6 and 8) can be used to electrically couple all of the reinforcing members 114 of the jack insert subassembly 50. By electrically linking the reinforcing members 114 together, all of the jack frames 56 mounted on the jack insert body 54 can be commonly grounded to the chassis shield ground through only one of the ground springs 70 of the 14 jacks. Further, the linking members 116 can facilitate assembly of the jack insert subassembly 50 by allowing all of the reinforcing members 114 to be simultaneously mounted in the jack insert body 54.

iii. LED Mounting Configuration

Referring again to FIG. 10, the LED 36 includes a main body 118 on which a lens 120 is mounted. A dielectric spacer/extension 122 projects outwardly from the back end of the main body 118. Electrical leads 124 also project outwardly from the rear end of the main body 118. The leads 124 are separated, and electrically isolated by the spacer 122. Preferably, the spacer 122 provides spacing between the leads 124 that is substantially less than a diameter of the main body 118 of the LED 36. This reduction in spacing between the leads 124 assists in minimizing the height of the LED mount portion 102 of the jack insert 54.

Figure 7:
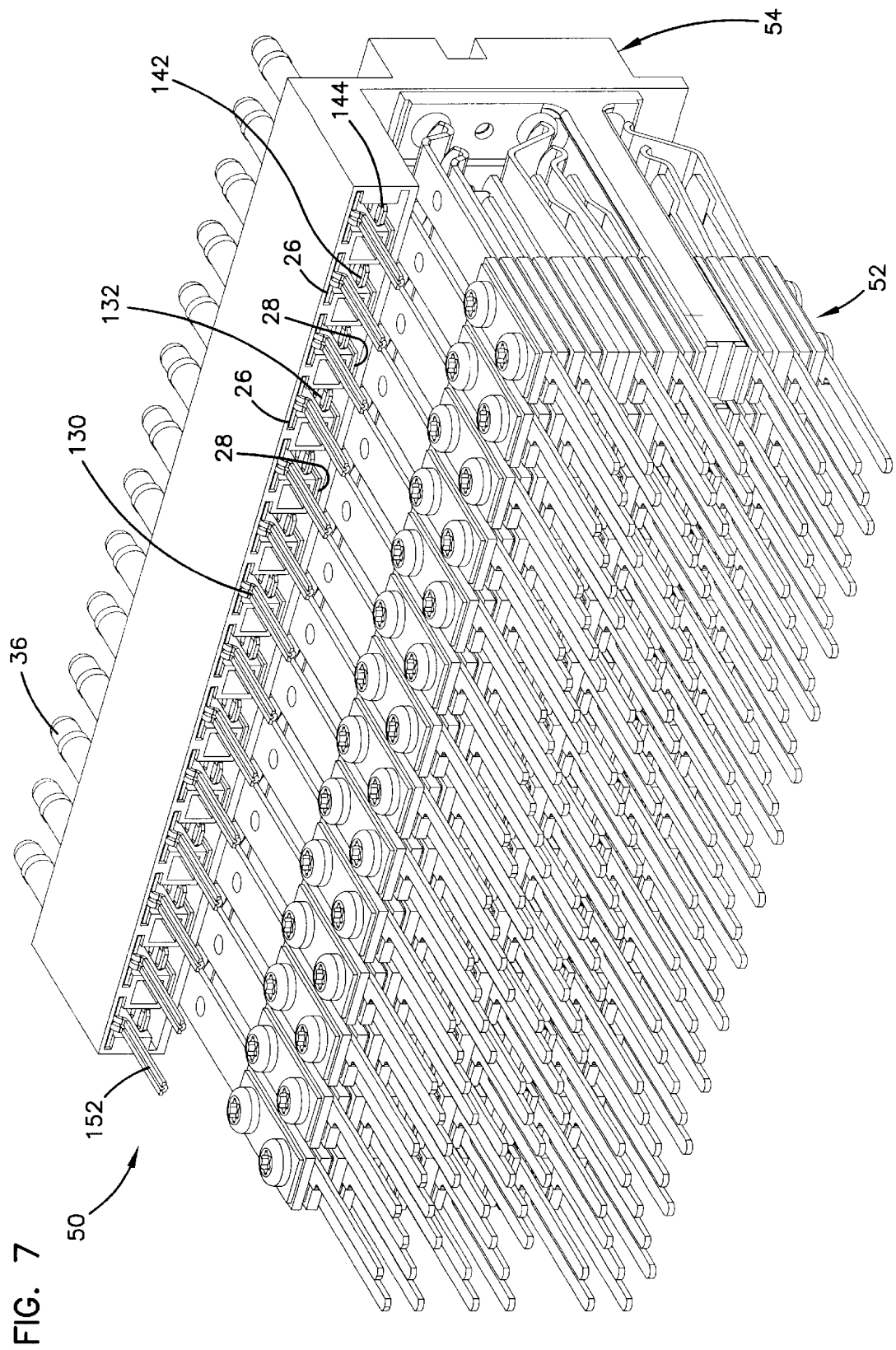
FIG. 7 is a rear, perspective view of the jack insert subassembly of FIG. 6.
Figure 12:
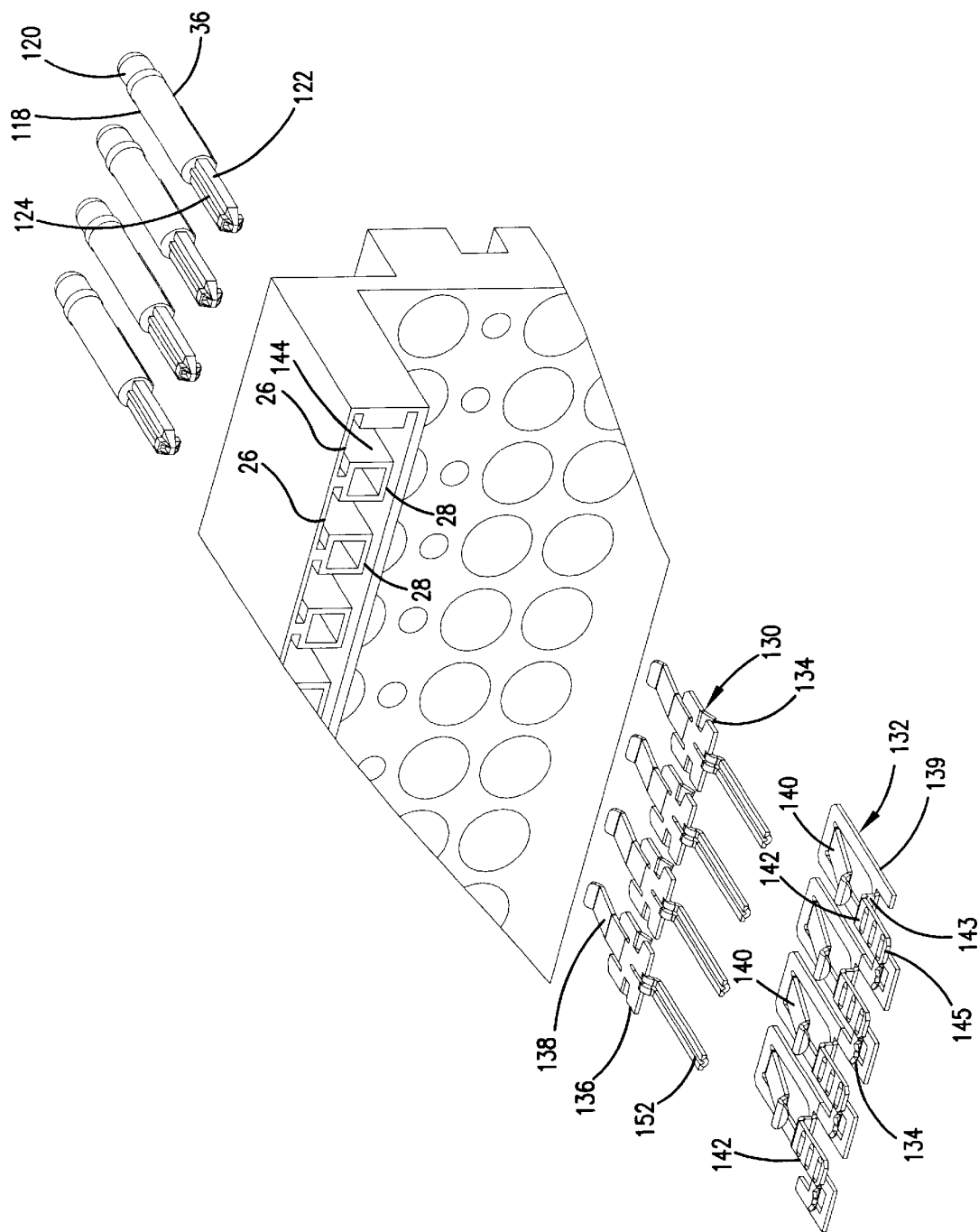
FIG. 12 illustrates a portion of the jack insert subassembly with the LED spring contacts exploded for clarity.

Referring to FIGS. 7, 10 and 12, the LED mount portion 102 of the jack insert body 54 defines upper spring mounting slots 126 and lower spring mounting slots 128. Upper conductors 130 are mounted in the upper slots 126, and electrically connect with the upper leads 124 of the LEDs 36. Lower conductors 132 are mounted in the lower slots 128 and electrically contact the lower leads 124 of the LEDs 36; The conductors 130 and 132 include barbs or tabs 134 that embed in the material forming the LED mount portion 102 of the jack insert body 54 to prevent the conductors 130 and 132 from dislodging from the slots 126 and 128. Preferably, the conductors 130 and 132 are mounted in the slots 126 and 128 in a manner in accordance with the teaching of U.S. Pat. No. 4,870,753, that is hereby incorporated by reference.

The upper conductors 130 include base portions 136 that are firmly secured in the upper slots 126, and spring portions 138 having base ends connected to the base portions 136. From their base ends, the spring portions 138 extend in a forward direction within the LED mount portion 102. Free ends of the spring portions 138 are biased into contact with the upper leads 124 of the LEDs 36.

The lower conductors 132 include base portions 139 that are firmly secured in the lower slots 128. The lower conductors 132 also include spring portions 140 that extend from the base portions 139 in a rearward direction and are biased into contact with the lower leads 124 of the LEDs 36. Thus, the spring portions 138 of the upper conductors 130 extend in an opposite direction as compared to the spring portions 140 of the lower conductors 132.

The lower conductors 132 also include connection members 142 sized to be received in a quick-connect style electric connector. The connection members 142 include offset portions 143 that project perpendicularly outwardly from the base portions 139, and contact portions 145 that project perpendicularly from the offset portions 143. As shown in the FIG. 12, the contact portions 145 are generally parallel with respect to the base portions 139. Preferably, each of the connection members 142 is positioned in alignment with a corresponding one of the spring portions 140. Referring to FIG. 7, when the lower conductors 132 are mounted in the insert body 54, the connection members 142 are positioned within vertical gaps 144 defined by the LED mount portion 102 of the jack insert body 54.

Preferably, the lower conductors 132 are electrically tied together to form a strip as shown in FIG. 12. In use, the lower conductors 132 are preferably connected to a common power/voltage source. The raised connection members 142 facilitate connecting the lower springs 132 to the power source by providing connection locations for connecting a wire to the electrically linked conductors 132. For example, by inserting a quick connect over one of the various connection members 142, the entire strip of lower conductors 132 can be quickly wired to a power source. Additionally, the raised connection members 142 allow the lower conductors 132 of the various jack insert subassemblies 50 to be easily electrically connected together (e.g., by s single jumper between adjacent jack subassemblies 50). To facilitate inserting a quick connector over the connection members 142, portions of the LED mount portion 102 can be cut-away to provide additional clearance. For example, portions of the LED mount portion 102 can be cut away adjacent the second connecting members 142 corresponding to the second and thirteenth jacks of the subassembly.

Unlike the lower conductors 132, the upper conductors 130 are preferably not electrically interconnected with one another. In use, each of the springs 130 includes a wire wrap member 152 for allowing each upper conductor 130 to be electrically connected to its corresponding lamp switch 92. When the lamp switch 92 is closed, the corresponding upper conductor 130 is electrically connected to ground thereby causing power to be supplied to the LED 36 such that the LED 36 is lighted.

III. EXEMPLARY WIRING CONFIGURATION FOR CHASSIS

Figure 11:
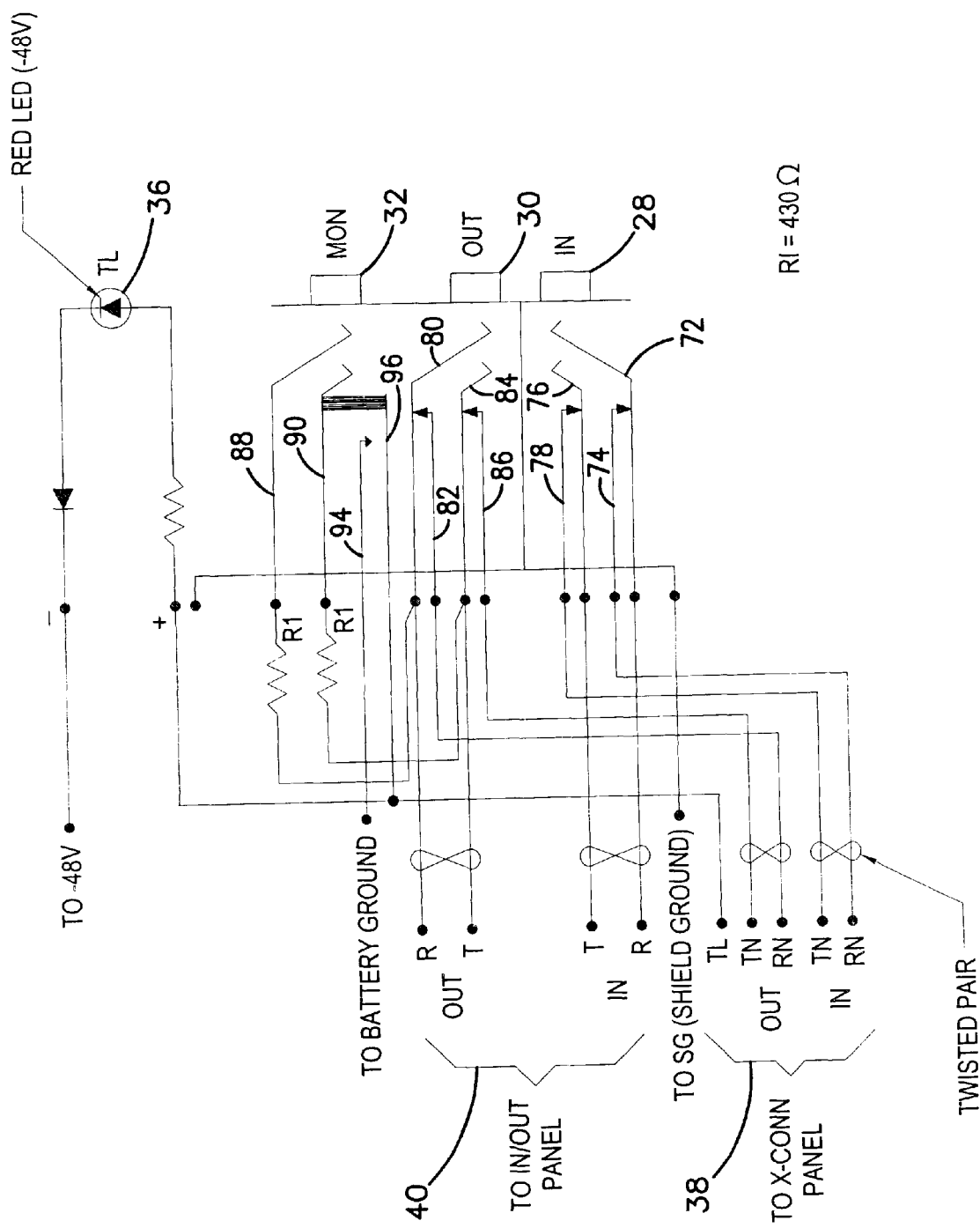
FIG. 11 is an exemplary wiring schematic for one of the jacks of the chassis of FIG. 1.

FIG. 11 shows an exemplary wiring schematic for one of the jacks 52 within the chassis 20. As shown in FIG. 11, the in spring contacts 72 and 76 are wired to the T-IN and R-IN connection locations at the IN/OUT panel 40, and the in normal spring contact 74 and 78 are wired to the TN-IN and RN-IN connection locations at the X-CONN panel 38. Similarly, the out spring contacts 80 and 84 are wired to the T-OUT and R-OUT connection locations of the IN/OUT panel, and the out normal springs 82 and 86 are wired to the TN-OUT and RN-OUT connection locations of the X-CONN panel 38. Further, the monitor ring spring 88 is electrically connected to the out ring spring 80, and the monitor tip spring 90 is electrically connected to the out tip spring 84. Moreover, the first contact spring 94 of the lamp switch 92 is electrically connected to the battery ground and the second contact spring 96 of the lamp switch 92 is electrically connected to a tracer lamp connection location TL at the cross-connect panel 38, and to the LED 36 which is connected to the power source. Furthermore, the grounding spring 70 is electrically connected to the shield ground 48 of the chassis 20.

In use, cross-connection of a signal from another jack enters the chassis 20 as an IN signal through connection locations TN-IN and RN-IN of the X-CONN panel 38. With no plugs inserted within the IN port 28, the IN signal is output from the chassis 20 at the T-IN and R-IN connection locations of the IN/OUT panel 40.

By inserting a plug within the IN port 28, the IN signal from a cross-connected jack can be interrupted and a signal from the inserted plug can be outputted at points T-IN, R-IN of the IN/OUT panel 40. Similarly, by inserting a plug within the OUT port 30, an OUT signal from contact points T-OUT and R-OUT of the IN/OUT panel 40 may be outputted to the tip-and-ring contacts of the plug inserted within the OUT port 30.

Frequently, it is desirable to be able to monitor OUT signals arriving through the T-OUT and R-OUT contacts of the IN/OUT panel 40 without interrupting the OUT signals. To accomplish this, a plug is inserted into the MONITOR port 32. On this occurrence, the plug taps into the OUT signals being transmitted through out springs 80–86. Additionally, when the plug is inserted into the MONITOR port 32, the second contact spring 96 of the lamp switch 92 is allowed to flex upwardly to close the lamp switch 92. With the lamp switch 92 closed, power is provided to the LED 36. It will be appreciated that the LED 36 can include an integrated circuit chip for controlling flashing of the LED 36 as is conventionally known in the art. In addition to activating the LED 36, the closure of the lamp switch 92 also grounds the tracer lamp line TL causing illumination of the LED of a jack to which the present jack is cross-connected.

IV. ALTERNATE JACK CONFIGURATIONS

Figure 15:
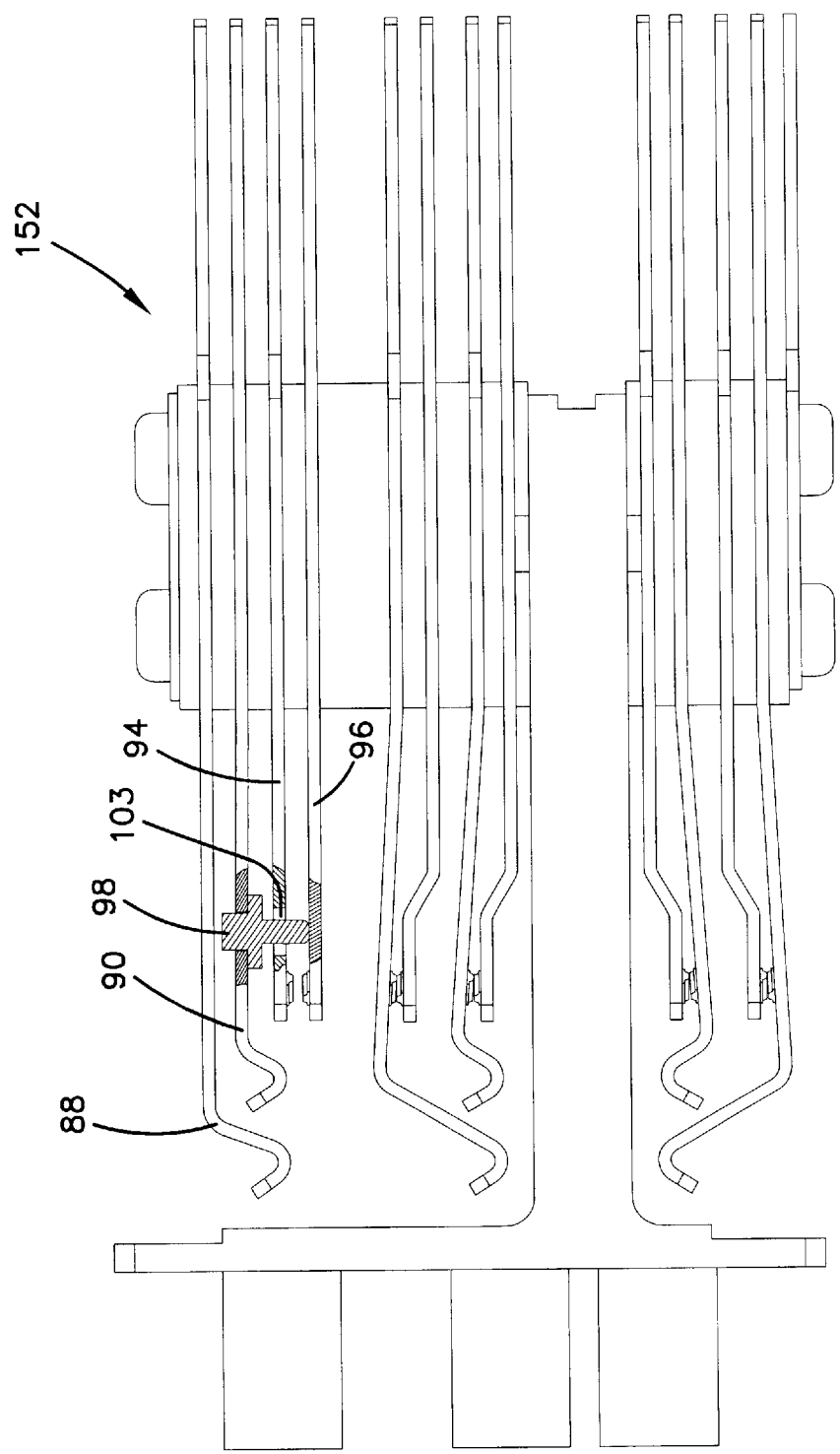
FIG. 15 illustrates a second jack constructed in accordance with the principles of the present invention.

FIG. 15 illustrates a second jack 152 having the same configuration as the jack 52 except that dielectric spacer 98 secured to monitor tip spring 90 has been arranged to pass through an opening 103 defined by first contact spring 94 of lamp switch 92. Similar to the jack 52, the lamp switch 92 is normally closed. It will be understood that the phrase "normally closed" means that the switch will move to a closed position unless an additional structure (e.g., spacer 98) is used to push or hold the switch open. When no plug is inserted within MONITOR port 32, spacer 98 prevents the second contact spring 96 from engaging the first contact spring 94. By contrast, when a plug is inserted within the MONITOR port 32, monitor tip spring 90 is displaced upwardly such that dielectric spacer 98 also is moved upwardly. With the dielectric spacer 98 displaced upwardly, the self-bias of the second contact spring 96 brings the second contact spring 96 into contact with the first contact spring 94 thereby closing the lamp switch 92.

Figure 16:
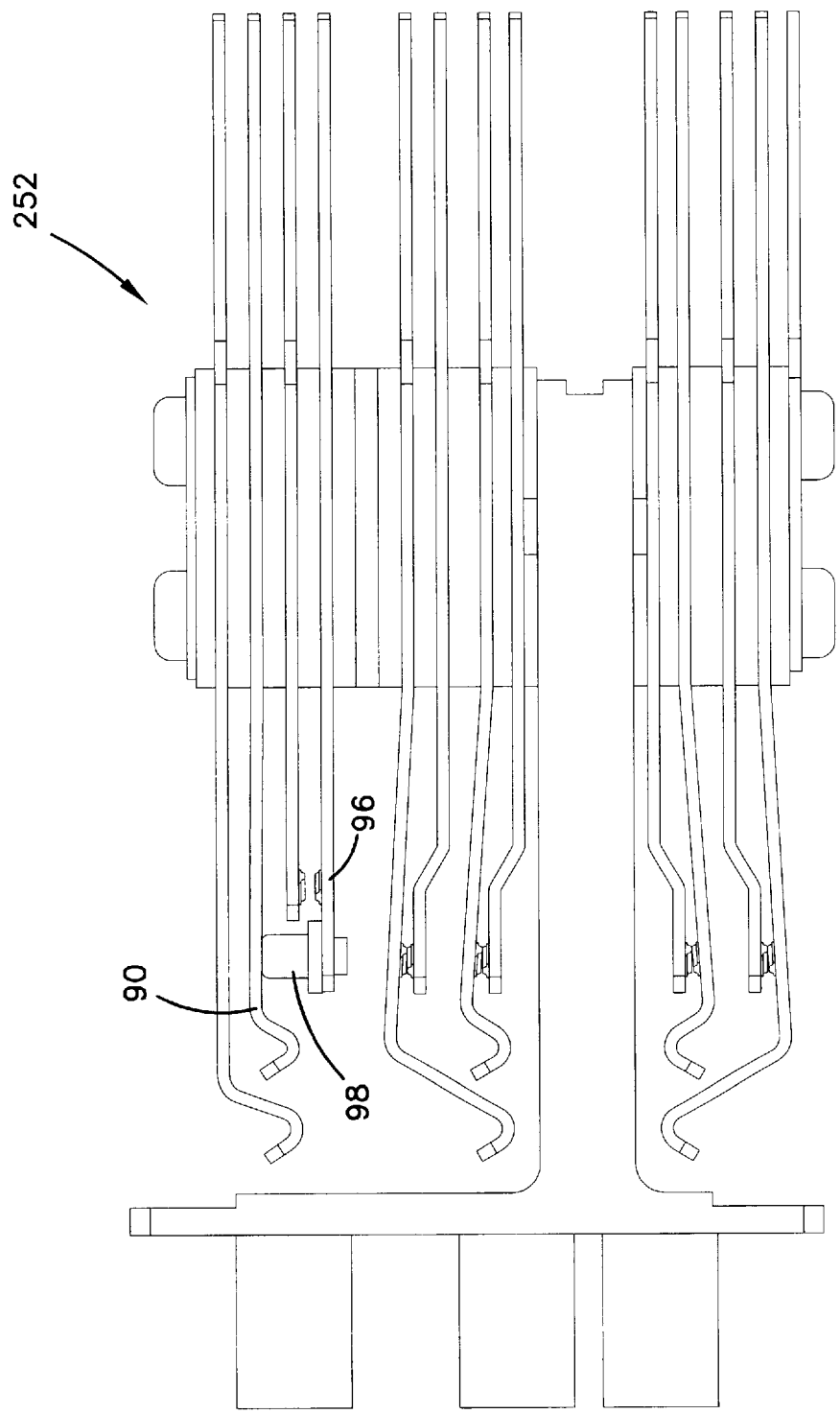
FIG. 16 illustrates a third jack constructed in accordance with the principles of the present invention.

FIG. 16 illustrates a third jack 252 constructed in accordance with the principles of the present invention. The jack 252 has the same construction as the jack 52, except that dielectric spacer 98 has been mounted on second contact spring 96 as compared to monitor tip spring 90.

Figure 17:
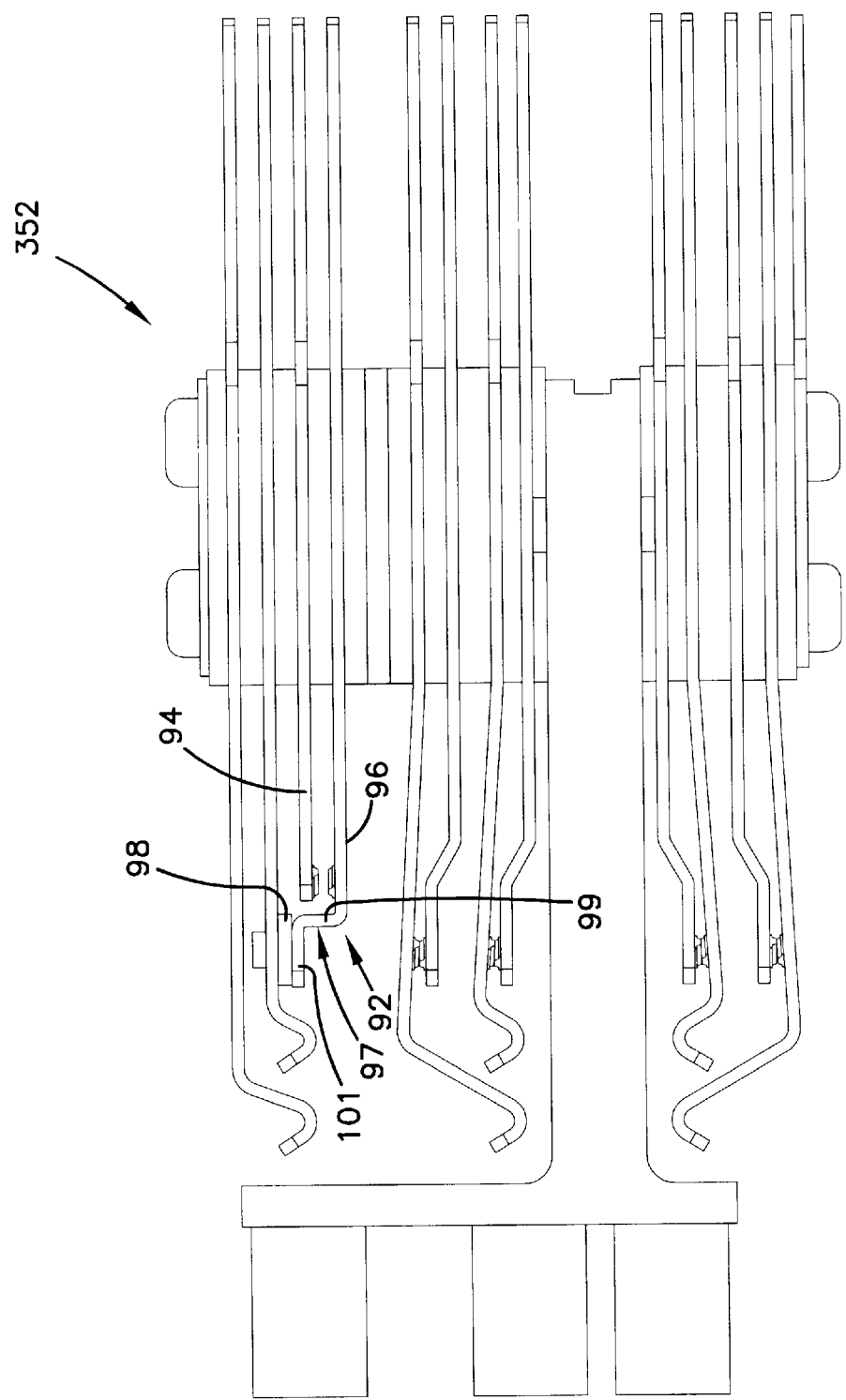
FIG. 17 illustrates a fourth jack constructed in accordance with the principles of the present invention.

FIG. 17 illustrates a fourth jack 352 constructed in accordance with the principles of the prevent invention. The jack 352 has the same structure as the jack 52 except that dielectric spacer 98 has been shortened and an end portion 97 of second contact spring 96 of lamp switch 92 has been modified to traverse the distance between second contact spring 96 and spacer 98. For example, the end portion 97 is shown including an upwardly extending portion 99 that extends upwardly past the upper spring 94 of the lamp switch 92, and a platform 101 for supporting the spacer 98. Similar to the previous embodiments, second contact spring 96 is normally biased toward the closed position.

Figure 18:
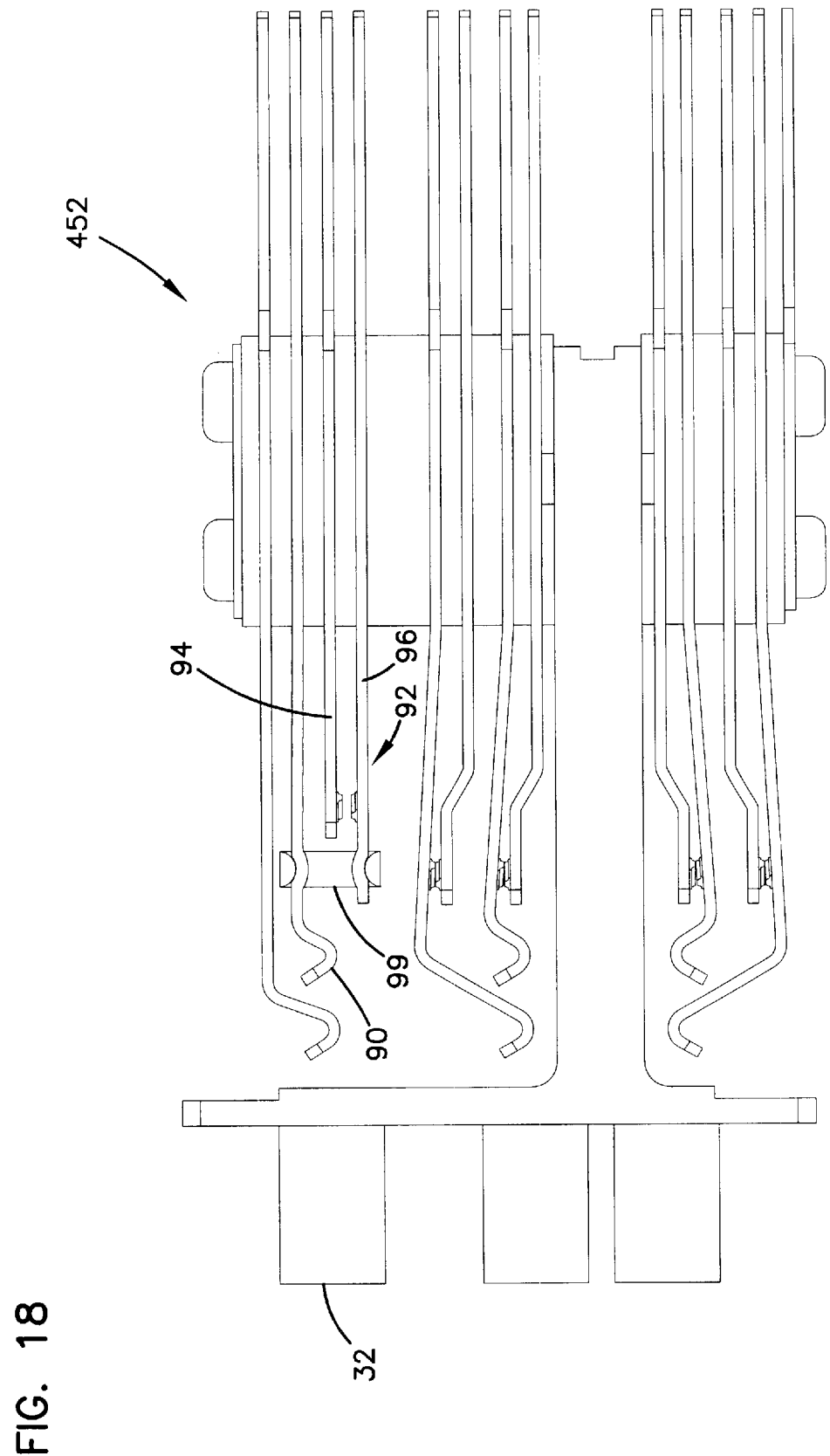
FIG. 18 illustrates a fifth jack constructed in accordance with the principles of the present invention.

FIG. 18 illustrates a fifth jack 452 constructed in accordance with the principles of the present invention. The jack 452 has the same construction as the jack 52 except that lamp switch 92 is a normally open switch (i.e., the switch remains open unless an additional structure is used to force the switch closed). Instead, in this embodiment, the monitor tip spring 90 positively moves the second contact spring 96 through the use of a link 99 providing a connection between the monitor tip spring 90 and the second contact spring 96. When no plug is inserted in the MONITOR port 30, the lamp switch 92 is open as shown in FIG. 18. By contrast, when a plug is inserted in MONITOR port 32, the monitor tip spring 90 is forced upwardly by the plug causing the link 99 to pull the second contact spring 96 into contact with the first contact spring 94. In this manner, the lamp switch 92 is positively closed when a plug is inserted in the MONITOR port 32.

Figure 19:
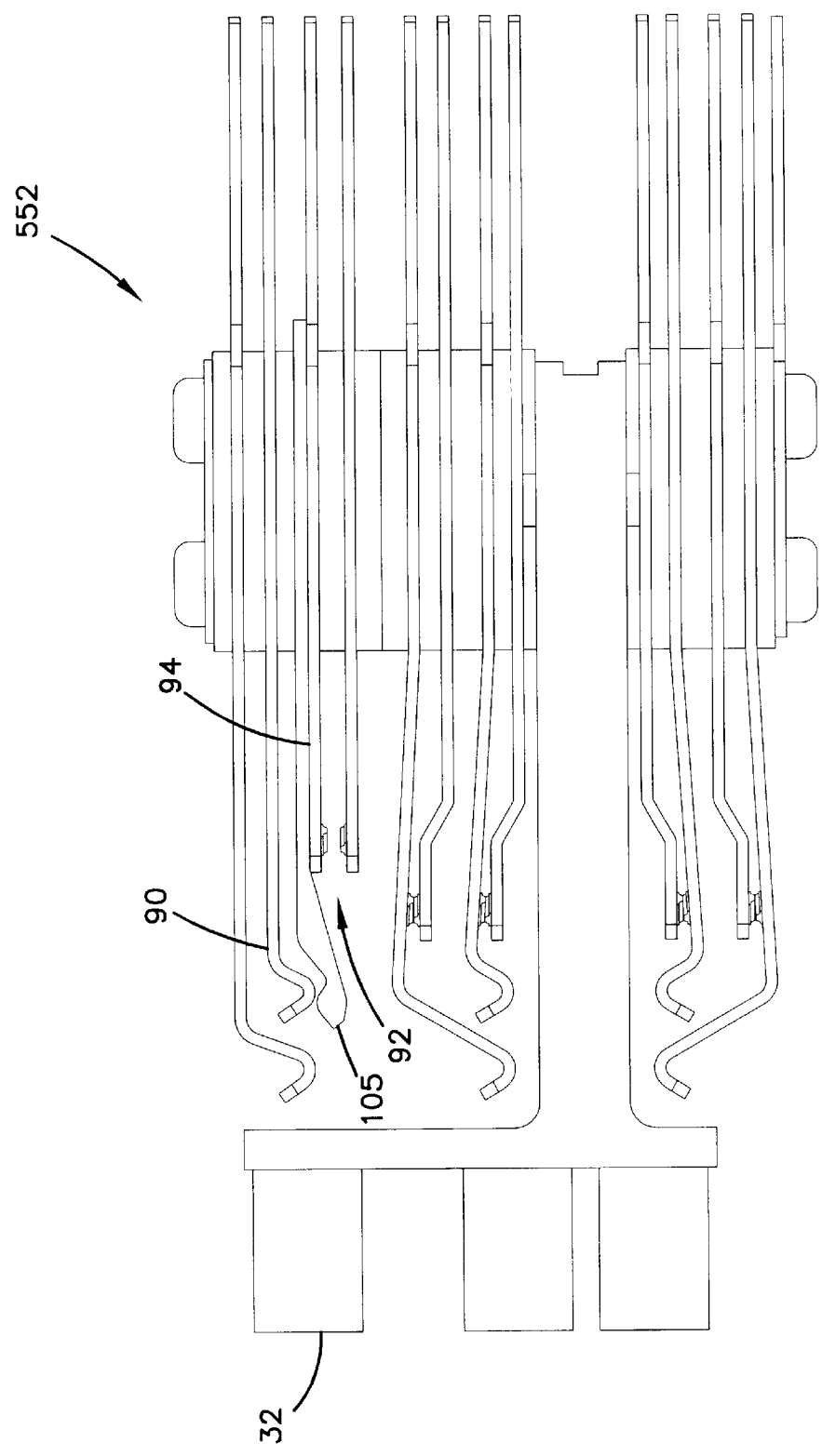
FIG. 19 illustrates a sixth jack constructed in accordance with the principles of the present invention.

FIG. 19 is a sixth jack 552 constructed in accordance with the principles of the present invention. The jack 552 has a similar construction to the jack 52 except the lamp switch 92 is normally open. Further, the jack 552 includes a dielectric ramp 105 that projects forwardly from the first contact spring 94 to a location directly below the contact region of the monitor tip spring 90. When no plug is inserted in the MONITOR port 32, the lamp switch 92 is open. By contrast, when a plug is inserted in the MONITOR port 32, the plug engages the ramp member 105 and forces the ramp member 105 downwardly causing the first contact spring 94 to be positively forced downwardly into contact with contact spring 96.

Figure 20:
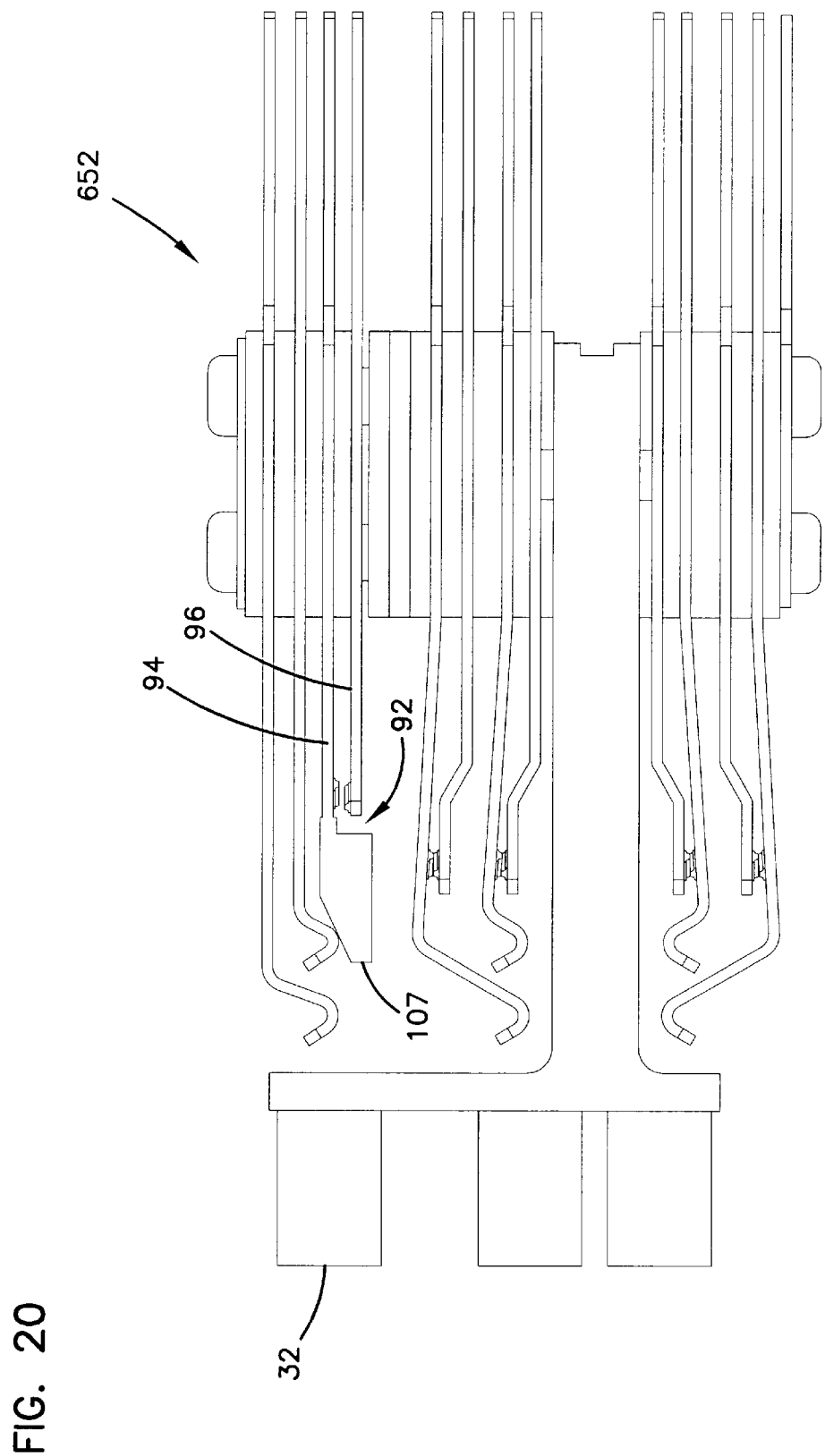
FIG. 20 illustrates a seventh jack constructed in accordance with the principles of the present invention.

FIG. 20 illustrates a seventh jack 652 constructed in accordance with the principles of the present invention. The jack 652 has a similar configuration as the jack 52 except that the lamp switch 92 is a normally open switch. Similar to the embodiment of FIG. 19, the jack 652 includes a dielectric ramp 107 connected to the first contact spring 94 of the lamp switch 92. The ramp 107 has an angled surface positioned directly beneath the contact region of the monitor tip spring 90. When no plug is inserted in the MONITOR port 32, the lamp switch 92 is open as shown in FIG. 20. By contrast, when a plug is inserted within the MONITOR port 32, the plug engages the inclined ramp surface of the ramp 107 causing the first contact spring 94 to be forced downwardly into contact with the second contact spring 96.

Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A telecommunications apparatus for use with a signal lamp, the apparatus comprising:
    a jack including:
        jack body defining an IN port, an OUT port and a MONITOR port, and the ports being aligned along a vertical line with the OUT port positioned above the IN port and the MONITOR port positioned above the OUT port;
        a set of IN port spring contacts for contacting a plug inserted in the IN port;
        a set of OUT port spring contacts for contacting a plug inserted in the OUT port;
        a set of MONITOR port spring contacts for contacting a plug inserted in the MONITOR port; and
        a lamp switch for activating and de-activating the signal lamp, the lamp switch being positioned below the MONITOR port spring contacts and above the OUT port spring contacts.

2. The telecommunications apparatus of claim 1, wherein the lamp switch is a normally closed switch.

3. The telecommunications apparatus of claim 2, further comprising a spacer that engages at least one of the MONITOR port spring contacts and that holds the lamp switch in an open position when no plug is inserted in the MONITOR port.

4. The telecommunications apparatus of claim 3, wherein the spacer is mounted on one of the MONITOR port spring contacts.

5. The telecommunications apparatus of claim 3, wherein the lamp switch includes upper and lower spring contacts, and wherein the spacer is mounted on the lower spring contact.

6. The telecommunications jack of claim 3, wherein the lamp switch defines upper and lower spring contacts, wherein the upper spring contact defines an opening, and wherein the spacer extends through the opening in the upper spring contact to engage the lower spring contact.

7. The telecommunications jack of claim 3, wherein the lamp switch defines upper and lower spring contacts, wherein the lower spring contact includes an end portion having a portion that extends upwardly toward the MONITOR port spring contacts, and wherein the spacer is positioned between the end portion and one of the MONITOR port spring contacts.

8. The telecommunications jack of claim 3, wherein the end portion of the lower spring contact includes an upper extension and a platform, and wherein the spacer is supported on the platform.

9. The telecommunications jack of claim 1, wherein the lamp switch includes an upper spring contact and a lower spring contact, and wherein the jack includes an intermediate member that extends from one of the MONITOR port spring contacts to the lower spring contact for controlling whether the lamp switch is open or closed.

10. The telecommunications jack of claim 9, wherein the intermediate member includes a link that pulls the lamp switch closed when a plug is inserted in the MONITOR port.

11. The telecommunications jack of claim 1, further comprising a ramp structure positioned adjacent the MONITOR port for closing the lamp switch when a plug is inserted in the MONITOR port.

12. The telecommunications jack of claim 11, wherein the lamp switch includes upper and lower spring contacts, and wherein the ramp structure is connected to the upper contact spring.

13. A telecommunications jack comprising:
    a jack body defining first, second and third ports positioned such that the second port is generally between the first and third ports;
    a first set of spring contacts positioned adjacent the first port;
    a second set of spring contacts positioned adjacent the second port;
    a third set of spring contacts positioned adjacent the third port; and
    a lamp switch positioned between the second and third sets of spring contacts.

14. The telecommunications jack of claim 13, wherein the first, second and third sets of springs are connected to the jack body.

15. The telecommunications jack of claim 13, wherein the first, second and third sets of springs are arranged in a stacked relationship.

16. The telecommunications jack of claim 13, wherein the first port is an IN port, the second port is an OUT port, and the third port is a MONITOR port.

17. The telecommunications apparatus of claim 16, wherein the lamp switch is a normally closed switch.

18. The telecommunications apparatus of claim 17, further comprising a spacer that engages at least one of the spring contacts of the third set of spring contacts, and that holds the lamp switch in an open position when no plug is inserted in the MONITOR port.

19. The telecommunications jack of claim 13, wherein the lamp switch includes a first spring contact and a second spring contact, and wherein the jack includes an intermediate member for controlling whether the lamp switch is open or closed, the intermediate member extending from one of the spring contacts of the third set of spring contacts past the first spring contact to the second spring contact.

20. The telecommunication jack of claim 19, wherein the intermediate member includes a link that pulls the lamp switch closed when a plug is inserted in the third port.

21. The telecommunications jack of claim 16, further comprising a ramp structure positioned adjacent the MONITOR port for closing the lamp switch when a plug is inserted in the MONITOR port.

22. The telecommunications jack of claim 21, wherein the lamp switch includes first and second spring contacts, and wherein the ramp structure is connected to one of the contact springs of the lamp switch.

23. A telecommunications apparatus comprising:
   A. a chassis having oppositely positioned first and second sides;
   B. a plurality of signal lamps positioned at the first side of the chassis;
   C. an IN/OUT panel including an array of IN and OUT connection locations positioned at the second side of the chassis;
   D. a cross-connect panel including an array of cross-connect connection locations positioned at the second side of the chassis;
   E. a plurality of jacks mounted in the chassis, each of the jacks including:
      i) a jack body defining a first port, a second port and a third port;
      ii) a first set of spring contacts positioned adjacent the first port;
      iii) a second set of spring contacts positioned adjacent second port;
      iv) a third set of spring contacts positioned adjacent the third port; and
      v) a lamp switch positioned between the second and third sets of spring contacts;
   F. the first sets of spring contacts being electrically connected to the cross-connect panel and the IN/OUT panel;
   G. the second sets of spring contacts being electrically connected to the cross-connect panel and the IN/OUT panel;
   H. the third sets of spring contacts being electrically connected to corresponding ones of the second sets of spring contacts such that signals transmitted through the second sets of spring contacts can be monitored by inserting plugs in the third ports; and
   I. the lamp switches being electrically connected to the signal lamps such that when each lamp switch is closed, a corresponding one of the light emitting diodes is activated, each lamp switch being configured to close when a plug is inserted in a corresponding one of the third ports.

* * * * *

UNITED STATES PATENT AND TRADEMARK OFFICE
CERTIFICATE OF CORRECTION

PATENT NO. : 6,422,902 B1
DATED : July 23, 2002
INVENTOR(S) : Ogren et al.

It is certified that error appears in the above-identified patent and that said Letters Patent is hereby corrected as shown below:

Column 1,
Line 43, "ajack having ajack body" should read -- a jack having a jack body --

Column 9,
Line 37, "jack body defining" should read -- a jack body defining --

Column 11,
Line 1, "telecommunication" should read -- telecommunications --
Line 26, "ajack body" should read -- a jack body --

Signed and Sealed this

Fifth Day of August, 2003

JAMES E. ROGAN
*Director of the United States Patent and Trademark Office*